June 13, 1939.  H. M. PITT. JR., ET AL  2,162,637
PROCESS FOR THE PRODUCTION OF LIQUID SULPHUR DIOXIDE
Filed July 6, 1937  4 Sheets—Sheet 4
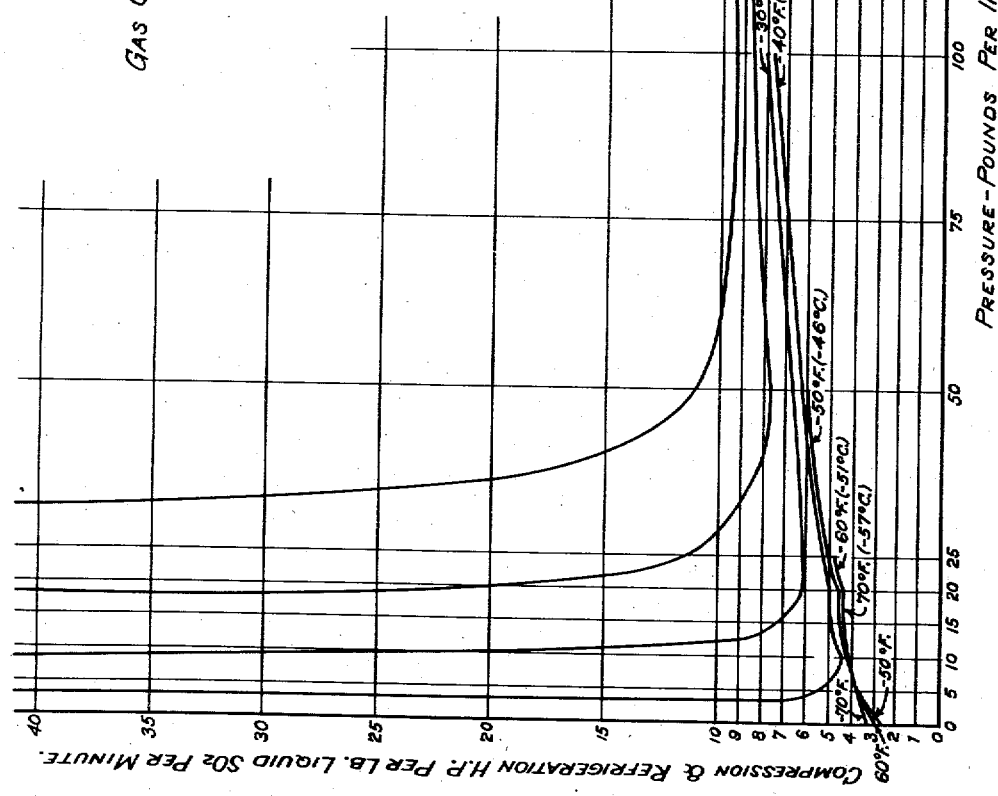
INVENTORS
HAROLD M. PITT JR.
ALFRED M. ESBERG
BY Charles M. Fryer
ATTORNEY Patented June 13, 1939

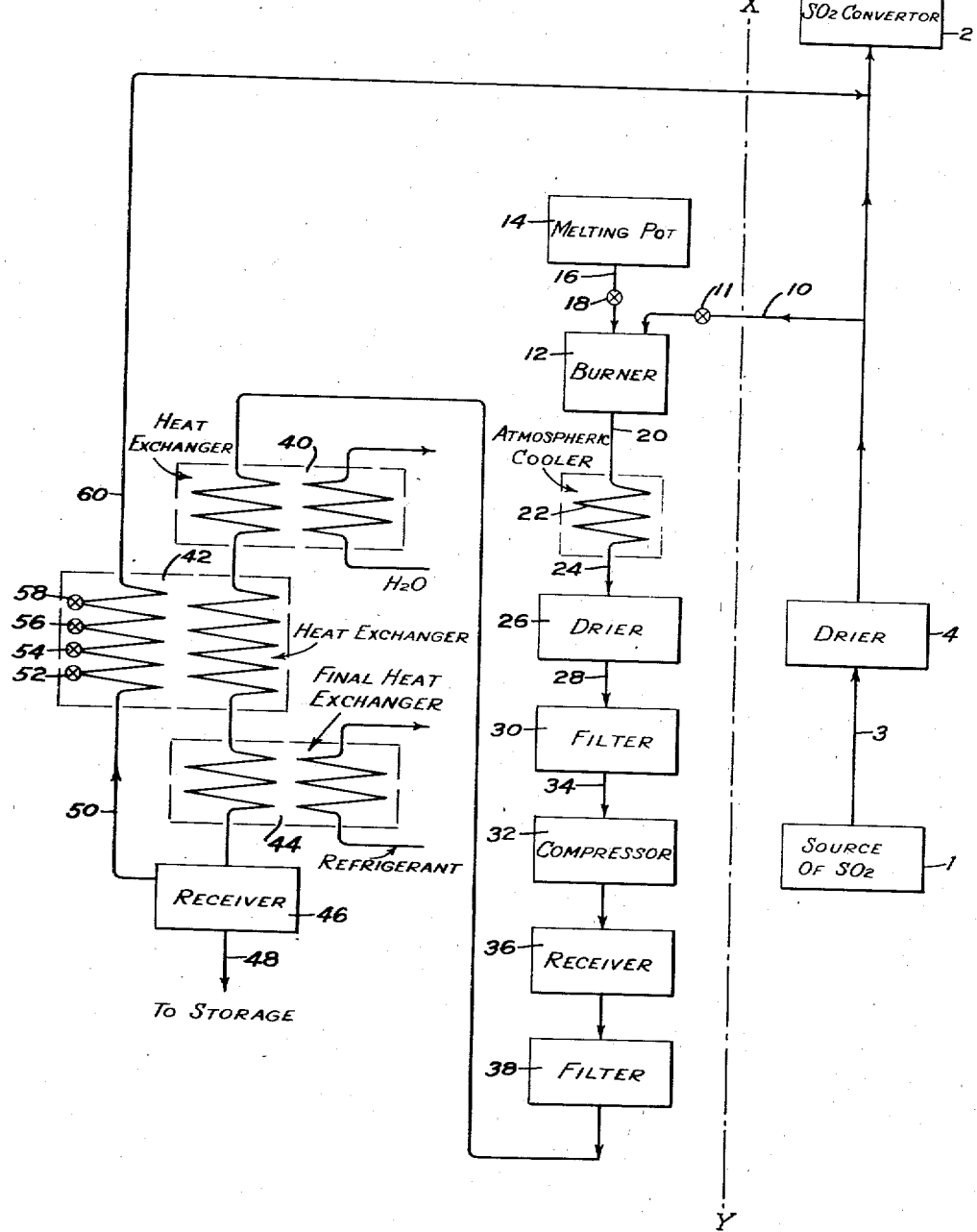

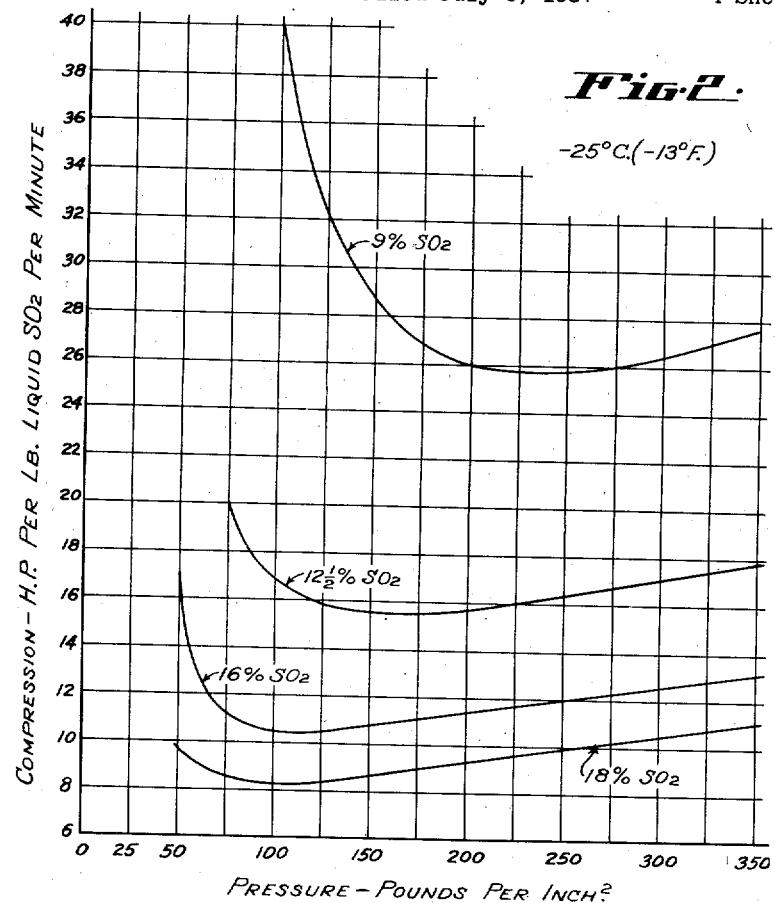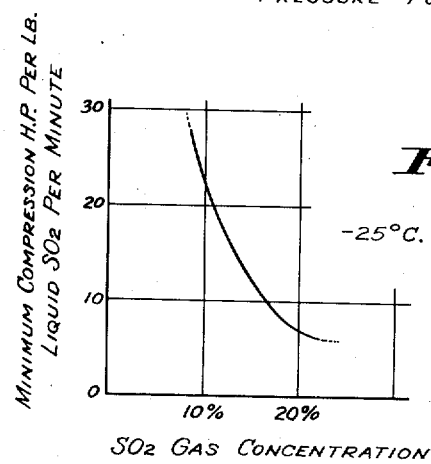

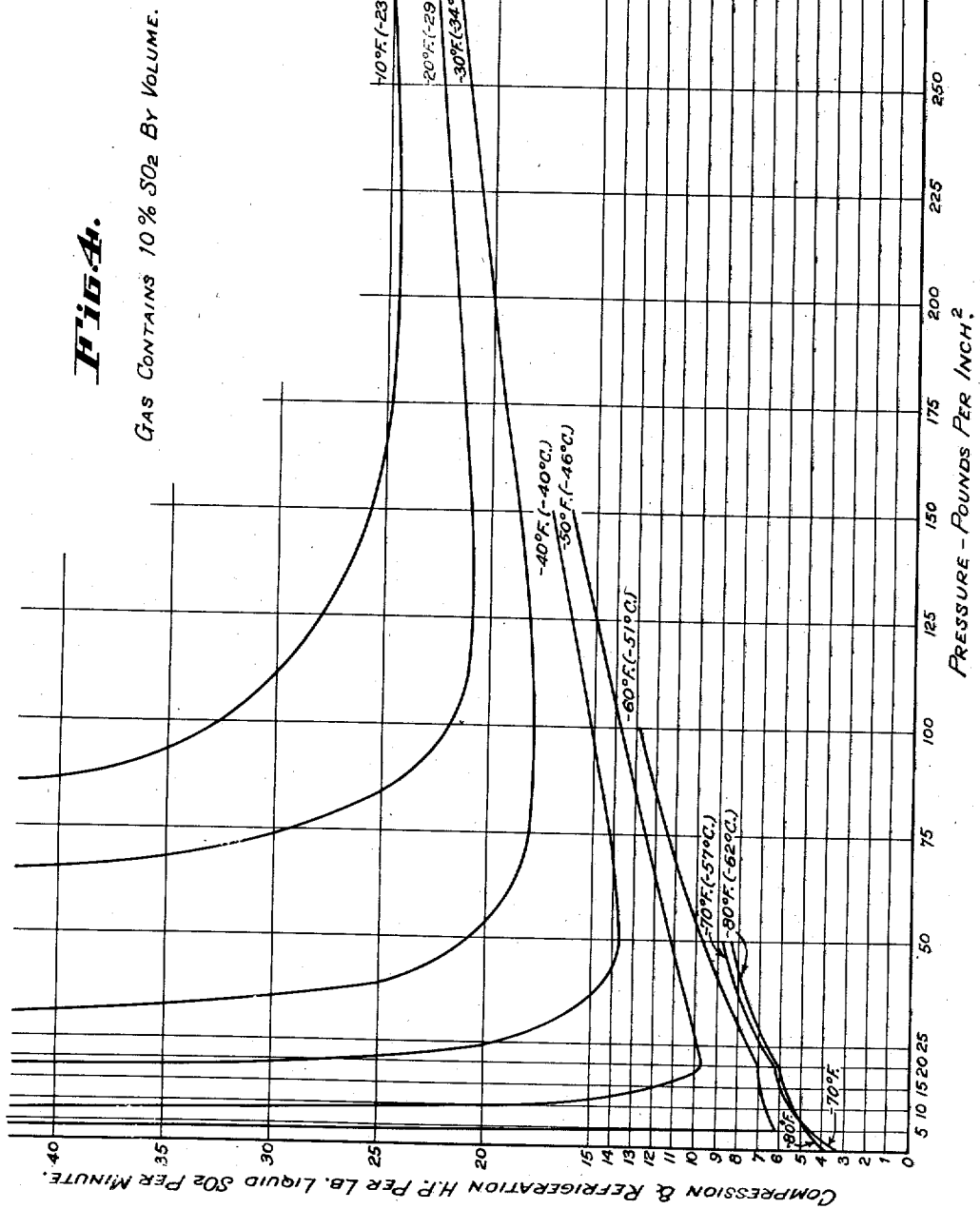

2,162,637

UNITED STATES PATENT OFFICE 2,162,637

PROCESS FOR THE PRODUCTION OF LIQUID SULPHUR DIOXIDE

Harold M. Pitt, Jr., Los Angeles, and Alfred M. Esberg, Mountain View, Calif.

Application July 6, 1937, Serial No. 152,086

11 Claims. (Cl. 62—175)

The present invention relates to the production of liquid sulphur dioxide; and this application is a continuation in part of our co-pending application, Ser. No. 92,330, filed July 24, 1936, for "Process for the production of liquid sulphur dioxide".

The previous procedures most generally used for recovering sulphur dioxide as liquid have followed the process of the United States Patent No. 376,883, granted Jan. 24, 1888, to Hanisch and Schroeder, in which process concentration of the sulphur dioxide is effected prior to its liquefaction by contacting the gas mixtures with water to absorb and dissolve the sulphur dioxide, boiling the solution to drive off the sulphur dioxide as gas, and thereafter liquefying the sulphur dioxide by compression and refrigeration, the degrees of compression and refrigeration used being rather high.

Principal objects of this invention are the provision of: an economical and dependable process for the production of liquid sulphur dioxide from gases containing sulphur dioxide along with another gas or gases which are more volatile than sulphur dioxide, especially where the gaseous mixture contains only a minor proportion of sulphur dioxide; a process for the production of liquid sulphur dioxide from gaseous mixtures intended primarily for other industrial uses, within the amount of liquid sulphur dioxide produced per unit of gas mixture treated is of less importance than is the amount produced per unit of power consumed; a simple, easy and economical manner of disposing of residual gases; and other objects of the invention will become apparent on reading this specification.

Sulphur dioxide-containing gases are used industrially, not only for the manufacture of liquid sulphur dioxide but for other purposes as well, including among others, conversion into sulphuric acid. They may be prepared by roasting, burning, or otherwise suitably oxidizing sulphur or sulphur-containing material. The burning of sulphur in oxygen can result in a gas consisting entirely of sulphur dioxide, as can the burning in oxygen of sulphur-bearing material in which the sulphur is the only component forming a gas on oxidation. The use of air as the source of oxygen avoids the expense of the production of the oxygen, but at the same time makes it theoretically impossible to produce a gas containing more than about 20 to 21% by volume of sulphur dioxide, since the volume of sulphur dioxide produced by combustion with air cannot theoretically exceed the volume of oxygen in the air. The sulphur dioxide-containing gases ordinarily used in sulphuric acid plants for the manufacture of sulphuric acid generally have a sulphur dioxide content of somewhere around 9% or 10%, more or less. Such gases are generally made by oxidizing sulphur or sulphur-bearing materials in air, air being used as the cheapest source of oxygen. An excess of air is ordinarily used for burning the sulphur to sulphur dioxide, whereby less sulphur trioxide is formed and less sulphur is carried as dust along with the gases. This excess of air should furnish sufficient oxygen to oxidize the sulphur dioxide to sulphur trioxide as the gases pass the contact mass. There is another reason for having an excess of air, namely that the oxidation of sulphur dioxide to sulphur trioxide is exothermic and considerable heat is evolved in the contact converters, and dilution with air decreases the excessively high temperature which would otherwise result. Theoretically, on the basis of air containing 20 to 21% of oxygen by volume, only two-thirds of this volume should be converted into sulphur dioxide, so that the theoretical maximum concentration of sulphur dioxide in the resulting gases is 13⅓% by volume, (supposing that the air contains exactly 20% by volume of oxygen), leaving the other 6⅔% by volume of oxygen for the conversion of sulphur dioxide into sulphur trioxide. It is, however, advisable not to run too close to the theoretical in plant operation, because if there is some slight variation in conditions there could easily develop a shortage of oxygen which would leave uncombined or unconverted sulphur dioxide in the gases after passing the contact mass, which would be wasted into the atmosphere. Some acid plants burn iron pyrites, $FeS_2$, as a source of sulphur dioxide. This type of material requires a greater excess of air to support combustion in the burner because the iron is converted into oxide and some of the oxygen becomes fixed as iron oxide whereby the volume of resulting gases is decreased. Theoretically, on the same supposition, the maximum amount of sulphur dioxide possible in these burner gases is 10.85% with 5.425% of oxygen, but in general practice the sulphur dioxide content is regulated to about 8%.

In the case of direct liquefaction of sulphur dioxide by compression and refrigeration of mixtures of sulphur dioxide with other more volatile gases, the lower the concentration of the sulphur dioxide in such gases, the lower must be the temperature used and/or the higher must be the pressure used, in order to liquefy an equal amount. The costs of power for refrigeration and compression are considerable, and the recovery of all of the sulphur dioxide as liquid from a mixture of gases containing it has always been exceedingly expensive. Because of the high power requirements of apparatus designed to condense liquid sulphur dioxide in this way from gases containing a minor proportion of sulphur dioxide, processes having in view the liquefaction of sulphur dioxide therefrom have not heretofore met with any substantial commercial success.

Tremendous volumes of gases, bearing up to somewhere around 10% of sulphur dioxide have been wasted into the air by smelters of metals, especially copper. Some of these gases are now being treated for the conversion of the sulphur dioxide therein into sulphuric acid, principally by the contact process. Some of these smelting operations are so conducted that the gases containing the sulphur dioxide are quite low in free oxygen and frequently practically devoid thereof. Conditions vary at the different places where the gases containing the sulphur dioxide are made, and whenever the concentration of free oxygen in the smelter gases is so low as to preclude enrichment of the sulphur dioxide content by burning sulphur therein, or to preclude it on an economical basis, enrichment may be by other means or it need not be attempted at all, but such smelter gases or a diverted portion thereof may be subjected to compression and refrigeration for the recovery of liquid sulphur dioxide as explained in this specification. Economical conditions may be such that even if free oxygen is present in the smelter gases it might be cheaper to use more power per pound of liquid sulphur dioxide produced rather than to buy additional sulphur. While enrichment is frequently preferred, there may be conditions which make it preferable not to enrich. Conditions may also exist where it is preferable to avoid enrichment even though very substantial amounts of free oxygen be present. It is easier to obtain liquid sulphur dioxide from a gaseous mixture containing more sulphur dioxide than from one containing less, but there are circumstances under which that advantage is overcome, so that enrichment is not always desirable.

Our invention involves, broadly, diverting or by-passing some of the sulphur dioxide-containing gases which are intended for other treatment, for example for the manufacture of sulphuric acid, while on their way to a treatment station, treating the diverted portion in such manner as to recover liquid sulphur dioxide therefrom at a minimum expense per pound of recovered material without particular regard to the proportion of sulphur dioxide stripped from these gases as liquid, and then returning the partially stripped gases to the stream from which they were diverted, preferably but not necessarily at a point between the point of diversion and the treatment station, or in some other manner whereby the same gas will preferably not be by-passed repeatedly. We prefer that the amount diverted for the extraction of sulphur dioxide as liquid be so proportioned that the returned stripped gases will have no substantial bad effect, by dilution or otherwise, on the treatment at the treatment station. With this in view, we generally prefer to deflect or divert from and return to the main stream of sulphur dioxide-containing gases only a comparatively small proportion of such main stream. We frequently prefer, although not always, to increase the concentration of sulphur dioxide in the diverted portion of the gases. This may be accomplished by converting unused oxygen remaining in the gases into sulphur dioxide, as by burning sulphur-bearing material, preferably sulphur itself, in such gases; or it may be accomplished in any other suitable manner. From a gas input of concentrations of about 15 to 20% it has been found that a substantial portion of the sulphur dioxide may be condensed to liquid form at pressures and temperatures attainable with power expenditures which are extremely low in proportion to the quantity of liquid sulphur dioxide recovered.

Difficulties have been encountered in the compression and other treatment of gases containing sulphur dioxide because these gases when compressed have a corroding effect on the material of the compressor and of the other apparatus which they contact, most parts of which are made of iron and steel. Such corrosion by the compressed gases can be avoided if they are substantially free of moisture, sulphur trioxide and sulphuric acid before they are compressed.

Present conditions in the refrigeration art are such that a temperature of —13° F. (—25° C.; 248° absolute) can be attained and maintained at comparatively low cost, and we have found that the amount of the compression horse-power per pound of liquid sulphur dioxide recovered per minute, and the compression costs thereof, not only decrease with increasing concentration of sulphur dioxide, but that for each concentration of sulphur dioxide there is a pressure at which this amount and the cost of the compression horsepower are at a minimum, and that either above or below this pressure the amount and the cost of the compression horsepower per pound per minute yield increases.

Referring to the accompanying drawings which form a part of this specification,

Fig. 1 is a diagrammatic illustration of a form of apparatus suitable for practising the invention;

Fig. 2 shows graphs with the power required for compression plotted against pressures, for gases of different concentrations of sulphur dioxide, at a temperature of —25° C. (—13° F., 248° absolute);

Fig. 3 shows a graph with the minimum power required for compression plotted against concentrations of sulphur dioxide, at the same temperature of —25° C.;

Fig. 4 shows graphs with the total power, that is the sum of the compression power and of the refrigeration power, plotted against pressures, for a gas containing 10% of sulphur dioxide, at the different temperatures indicated thereon, And Fig. 5 is similar to Fig. 4, but for a gas containing 18% of sulphur dioxide.

When compressing gas mixtures having different concentrations of sulphur dioxide, each to a different set of pressures, the number of power units required for compression only, and not including power required for refrigeration, to produce one pound of liquid sulphur dioxide per minute for each concentration, is generally not a simple function of the applied pressure. As the applied pressure increases, the amount of power required to produce one pound of liquid sulphur dioxide per minute first falls and then rises, thus indicating conditions under which there are minimum power requirements to produce one pound of sulphur dioxide per minute. The power for compression only, required to produce one pound of sulphur dioxide per minute, is plotted on Fig. 2 against sets of different pressures applied to gas mixtures of different concentrations of sulphur dioxide, with the gases cooled to a temperature of 248° absolute (minus 25° C.)

Fig. 2 shows that the horsepower required for compression only, to produce one pound of liquid sulphur dioxide per minute at the most economical or optimum conditions, as indicated by the lowermost points of each curve, decreases with decreasing rapidity as the sulphur dioxide concentration of the treated gas mixtures increases. The lowermost power values of the curves on Fig. 2 are plotted on Fig. 3 against concentrations of sulphur dioxide in the gas mixtures.

The power requirements for both compression and refrigeration, to produce one pound of liquid sulphur dioxide per minute, are plotted on Fig. 4 against the applied pressures, for a gas mixture containing ten percent (10%) of sulphur dioxide. Each curve in this figure indicates the relative values when the gas mixture is cooled to the particular temperature indicated at each curve. A like relationship of values for a gas mixture containing eighteen percent (18%) of sulphur dioxide is plotted on Fig. 5.

It will be seen that there is a minimum value of the combined compression and refrigeration power requirements for the different concentrations of sulphur dioxide and for each different temperature thereof, and that this minimum value decreases with the temperature to a certain point for each concentration of sulphur dioxide. The curves for —70° F. and for —80° F. on Fig. 4, cross each other, which indicates that very little, if anything, is to be gained by operating at a temperature below —70° F. on gases containing 10% of sulphur dioxide by volume. Fig. 5 likewise indicates that very little, if anything, is to be gained by operating at a temperature below —50° F. on gases containing 18% of sulphur dioxide by volume. It will therefore be apparent that at a given temperature and the indicated optimum pressure therefor, more liquid sulphur dioxide can be recovered per horsepower expended as the sulphur dioxide concentration of the input gas is increased, and that in the range of gas concentration up to about 20% this gain in efficiency is not merely in direct proportion to the increase of the gas concentration, but is in fact distinctly in an accelerating proportionate relation to the increase in sulphur dioxide concentration of the input gas.

That part of Fig. 1 to the right of the line X—Y represents generally any plant where sulphur dioxide is treated and which for purposes of illustration may be a contact plant for the manufacture of sulphuric acid; while that part of this figure to the left of such line represents a plant for making liquid sulphur dioxide. 1 is a source of sulphur dioxide, such as a smelting roaster or other device for oxidizing sulphur or sulphur-containing material with air to form sulphur dioxide, and 2 is a station for the treatment of the sulphur dioxide, for example for converting it into sulphur trioxide by the contact process. Somewhere along the path 3 of the sulphur-dioxide-containing gases from the source 1 thereof to the treatment station 2, a portion of these gases is diverted through the conduit 10 to the plant for liquefying sulphur dioxide. This gas may have a sulphur dioxide content of about 8, 9, or 10%, and contains some free oxygen, if from a present-day sulphuric acid contact plant. As is usual in contact plant operation, the gases are dried by means of sulphuric acid in a tower, as diagrammatically illustrated at 4, before reaching the treatment station 2. While it is not essential that the plant for making liquid sulphur dioxide receive dry gases, we prefer to divert dry rather than undried gases, for reasons which will appear hereinafter. Accordingly, the diverted portion of gases is led off into a pipe 10 at a point between the dryer 4 and the treatment station 2. The gases flowing through pipe 10 are controlled by a valve 11, and they may pass into a sulphur burner 12 fed with molten sulphur from a melting pot 14 through pipe 16 under control of valve 18.

Combustion of this sulphur in the burner 12 would theoretically yield gas of a maximum sulphur dioxide concentration of roughly 21% were it possible to convert all the oxygen of the air present into sulphur dioxide. Although in practice this maximum cannot, of course, be attained, it will be evident that the attainment of any concentration above that of the gases entering through pipe 10 will increase the efficiency of the process as described above. In practice, at the present stage of technological development of burners, it is possible to obtain sulphur dioxide concentrations of about 20% in burner gases, and it will be apparent, therefore, that by adjustment of the valve 18 to the optimum point, a sulphur dioxide concentration of 18% in the input gas may be maintained. With the gases present in the burner substantially dry, very little sulphur trioxide is produced in the burning of the sulphur. They need however not be dry for the moisture and sulphur trioxide can be removed later as will appear hereinafter.

From the burner 12 the input gases now having an increased content of sulphur dioxide, say in the neighborhood of 18%, are conducted through the pipe 20 to an atmospheric cooler 22 in which the temperature of the gases is reduced to substantially room temperature. Thence, the gases are conducted by pipe 24 to a drying tower 26 packed with inert material where they move in counter-current with sulphuric acid flowing over said material, and they are thoroughly dried as well as substantially cleared of any sulphur trioxide and sulphuric acid that may have been formed in the burner. From this tower the gases pass through pipe 28 to a filter 30 of any suitable construction for the removal of mechanically entrained sulphuric acid and final traces of sulphur trioxide. The compressor 32 receives the gases from the filter 30 through a pipe 34, and discharges the compressed gases, through suitable cleaning devices which may be a receiver 36 and a filter 38, for removing entrained oil and the like, into a water-cooled heat exchanger 40 adapted to reduce the temperature of the gas to about 298° absolute (25° C.; 77° F.).

Thence, the compressed gases at said temperature are conveyed into a self-intensifying heat exchanger 42 in which further heat is removed from the compressed gas by plural stage expansion of stripped gases from the end of the process, as hereinafter described. In this exchanger, the temperature of the compressed gases is reduced considerably and a certain percentage of the sulphur dioxide will be condensed. It is desirable, however, to pass the remaining gas through a final mechanically refrigerated heat exchanger 44 wherein its temperature is further reduced to about 248° absolute (—25° C.; —13° F.). As a result, about 65% of the sulphur dioxide contained in the input gas will be condensed to the liquid state and passed into a receiver 46 in which the stripped gas is separated from the liquid, the latter being drawn off to storage through pipe 48. The stripped gases, containing about 6.3% sulphur dioxide, pass from the receiver 46 through a pipe 50 to the self-intensifying heat exchanger 42 where they are expanded in a plurality of stages, through expansion valves 52, 54, 56 and 58 to cool the compressed gases in this exchanger, and they pass off through pipe 60 back to the stream 3 where they re-enter said stream, preferably at a point between the pipe 10 and the treatment station 2.

The treatment of gases containing about 18% of sulphur dioxide with a pressure of 100 lbs. per square inch and a temperature of 248° absolute is very economical and therefore preferred, but similar results may be secured to a lesser degree with gases having a lower content of sulphur dioxide, and at different temperatures and pressures. Under the preferred conditions above given, of pressure, temperature, and concentration of sulphur dioxide, the power costs for compression and refrigeration are at a minimum per pound of product with the use of present day apparatus. We therefore prefer to enrich the contact plant gases where this is economically feasible up to 18% to 20%, and at least up to 15% by volume. It is desired that the gases be quite dry in order to minimize the corroding effect thereof when compressed. If the steps of enriching the gases do not add any moisture thereto or if there be no enrichment, and if the gases diverted from the plant to the right of the line X—Y on Fig. 1 be sufficiently dry, the dryer 26 and the filter 30 may be omitted and the diverted gases may be directly led to the compressor. It is of course understood that the gases may be diverted from the path 3 without first being dried if the dryer 26 is used. We generally prefer to divert dry gases because it is just as simple, easy and economical to divert the gases after passing through the dryer 4 as to divert them before they have passed therethrough.

In prior proposed processes the first thought of the engineer was to liquefy as much as possible of the sulphur dioxide present; and with this primary thought pressures and temperatures were chosen to obtain this primarily desired result, and those chosen were of a high degree and therefore expensive. Our primary thought is to liquefy that amount of the sulphur dioxide present which can be liquefied at the minimum cost of production, more or less regardless of the amount of sulphur dioxide left in the residual gases. Such amount left is unimportant in one aspect of our invention because the residual gases are returned to the process from which they were deflected. Thus, we are enabled to choose the degrees of refrigeration and of compression that will produce liquid sulphur dioxide at the least cost per pound of product. We can choose them for the treatment of gases containing about 18 to 20% of sulphur dioxide, or 15%, or much less, and we can, in fact, do this in the case of gases consisting of any mixture of sulphur dioxide and one or more other gases more volatile than sulphur dioxide, even should the content of sulphur dioxide be greater than that obtainable by burning sulphur in air. The correlated optimum degrees of compression and refrigeration will be determined by the cost of each. Such costs will perhaps vary as improvements in compression and refrigeration are developed, thus perhaps changing the degrees of compression and refrigeration at which the costs thereof are the least per pound of product. It is even conceivable that compression may be entirely avoided if means should be developed for inexpensively attaining a high degree of refrigeration, and vice versa.

With a sulphur dioxide content left in the stripped gases of about 6.3% by volume it will be seen that all of the sulphur dioxide added by the enriching step is liquefied, with the gases from the contact plant functioning very much in the nature of a carrier as well as a supply of sulphur dioxide to be liquefied. If gases were deflected from a source containing about 6.3% of sulphur dioxide, and if such gases were enriched and then subjected to our process of liquefying sulphur dioxide, such gases would, in fact, be functioning merely as a carrier. It is to be noted that the figure of about 6.3% of sulphur dioxide in the residual gas results from one set of conditions and that this residual amount may vary on changing the conditions of operation, but the principle remains the same.

Where the incoming gases to be stripped contain more sulphur dioxide than is to be left in the stripped gases, enrichment becomes optional as does the degree of enrichment. For example, with contact plant gases containing 9% by volume of sulphur dioxide stripped down to a 6.3% content, only 30% of the sulphur dioxide diverted is liquefied and the remaining 70% is carried back to the process from which it was deflected. If, for example, one-tenth of the amount of sulphur dioxide-containing gases flowing to the treatment station 2 be deflected to the liquid sulphur dioxide plant and the stripped gases returned back into said stream, there will be a decrease in the amount of sulphur dioxide entering the reaction station of only about 3% of the otherwise normal amount. It is usually permissible to deflect this amount of the gases while on their way to the catalytic contact mass and to return the stripped gases containing the stated amount of sulphur dioxide back into the stream, but too much change in the conditions of operation of a contact process may require a resetting of the contact mass temperature control for most efficient operation, make the contact process uneconomical, or even make it inoperative. The proportion that may be by-passed will best be fixed by the contact plant engineers according to prevailing conditions or perhaps by more or less arbitrary rule. It is generally desirable not to disturb the process from which the gases are diverted, although there may be occasions when the operation of such process may be changed to meet the new conditions imposed by the diversion. The same applies to the amount of sulphur dioxide-containing gases to be diverted from processes other than the contact process for making sulphuric acid.

We have referred to a sulphuric acid contact plant as the source of the sulphur dioxide-containing gases but it is to be understood that a sulphuric acid chamber plant may be the source as may any other plant using sulphur dioxide-containing gases even for purposes other than the manufacture of sulphuric acid. Furthermore, any other type of plant for making liquid sulphur dioxide than the preferred one above described may be used in combination with any plant using gases containing sulphur dioxide. Also, gases containing more, and even much more, than about 20 to 21% by volume of sulphur dioxide and containing also other gases may be treated according to our invention should there be any plant for treating such gases from which any part may be diverted to a liquid sulphur dioxide plant. It will generally be uneconomical to use such gases for the manufacture of liquid sulphur dioxide on account of the cost of making the gases, but there may be conditions under which the recovery of liquid sulphur dioxide therefrom may be desirable.

While certain features have been referred to for the purpose of illustrating and describing the invention, yet changes may be made without departing from the spirit thereof.

The percentages of sulphur dioxide in the various gas mixtures, mentioned in this description, the appended claims, and on the drawings, are by volume.

Compression and refrigeration are both used at the present time in the liquefaction of sulphur dioxide in industrial practice to avoid extremely high costs. It is possible however that new developments or economic conditions may at some future time make it possible to liquefy sulphur dioxide with either the compression or the refrigeration approaching zero. Certain phases of the invention and certain of the claims are independent of the specific method of liquefaction, and the expression "compression and refrigeration", or expressions of similar import, in the claims is intended to include liquefaction regardless of whether either of the two approaches zero.

What we claim is:

1. The process which comprises diverting a portion of gas containing sulphur dioxide flowing between a source of said gas and a separate station for chemically reacting the sulphur dioxide in said gas, removing a part of the sulphur dioxide from said diverted gas, and recombining the residual gas with the remaining undiverted portion of said gas before reaching said station.

2. The process which comprises diverting to a plant for making liquid sulphur dioxide part of a stream of gas containing sulphur dioxide and other more volatile gas on its way from a source thereof to a separate station for chemically reacting said sulphur dioxide, separating as liquid a part of said sulphur dioxide in said diverted gas, and returning the residual gas to said stream at a point between the point of diversion and said station.

3. The process which comprises dividing into portions a mixture of gases containing sulphur dioxide and more volatile gas, subjecting a portion to degrees of compression and refrigeration economically obtainable and capable of liquefying some of the sulphur dioxide therein, separating the resulting liquid sulphur dioxide from the residual gas, combining said residual gas with another of said portions, and subjecting the resulting combination to another process for the conversion of the sulphur dioxide therein, the relative amounts of said portions being so correlated to each other and to the proportion of sulphur dioxide remaining in said residual gas, as not to defeat said other process.

4. The process which comprises oxidizing sulphur-bearing material in air, flowing the resulting gases to a station for converting the sulphur dioxide therein, diverting a portion of said gases before reaching said converting station, treating said diverted gas to recover a portion of the sulphur dioxide therein as a liquid, said treatment comprising the application of compression and refrigeration in degrees chosen more with regard to cost per pound than to amount produced, and combining the residual gases with gases flowing to said station.

5. The process which comprises diverting a portion of gas containing sulphur dioxide flowing between a source of said gas and a station for chemically reacting said gas, increasing the content of sulphur dioxide in said diverted portion, removing a part of the sulphur dioxide from said diverted portion, and recombining the residual gas with the undiverted portion of said gas before reaching said station, the relative amounts of said portions being so correlated to each other, to the proportion of sulphur dioxide remaining in said residual gas, and to said chemical reaction as to supply said station a sufficient concentration of sulphur dioxide to effect said chemical reaction.

6. The process which comprises diverting a portion of a mixture of gases made by oxidizing sulphur-bearing material in air, between a source of said mixture and a separate station for chemically reacting the same, adjusting the content of sulphur dioxide in said diverted portion to at least 15% by volume by burning sulphur therein, subjecting it to compression and refrigeration in a degree at which the power costs thereof per pound of liquid sulphur dioxide produced are economical, separating the resulting liquid sulphur dioxide, and combining the residual gas with undiverted gas at a point between the point of said diversion and said separation station.

7. The process which comprises oxidizing sulphur-bearing material in air, flowing the resulting gases to a station for converting the sulphur dioxide therein, diverting a portion of said gases before reaching said converting station, burning sulphur in said diverted gases to increase the sulphur dioxide content thereof to approximate industrially the theoretical maximum, subjecting said by-passed and enriched gases to a pressure of about 100 pounds per square inch and a temperature of about 248° absolute, separating the resulting liquid sulphur dioxide from the residual gas, and combining said residual gas with undiverted gases flowing to said station.

8. The process which comprises oxidizing sulphur-bearing material in air to produce gas containing sulphur dioxide for conversion into sulphuric acid in a contact acid plant, flowing a stream of said gas to a converting station in said plant, diverting a portion of said gas to a plant for making liquid sulphur dioxide, burning sulphur in said diverted portion to increase the sulphur dioxide content thereof to at least 15%, subjecting said enriched gas to a pressure of about 100 pounds per square inch and a temperature of about 248° absolute, separating the resulting liquid sulphur dioxide from the residual gas, whereby said residual gas contains about 6.3% of sulphur dioxide, and combining said residual gas with the undiverted portion of said stream flowing to said station, said residual gas diluting the sulphur dioxide content of said stream of gas insufficiently to defeat said contact process.

9. The process which comprises roasting sulphur-bearing material in air to produce gas containing sulphur dioxide for conversion into sulphuric acid in a contact acid plant, flowing a stream of said gas to a converting station in said plant, diverting a portion of said gas to a plant for making liquid sulphur dioxide, burning sulphur in said diverted portion to increase the sulphur dioxide content thereof to about 18%, subjecting said enriched gas to a pressure of about 100 pounds per square inch and a temperature of about 248° absolute, separating the resulting liquid sulphur dioxide from the residual gas, whereby said residual gas contains about 6.3% of sulphur dioxide, and combining said residual gas with the undiverted portion of said stream flowing to said station, said residual gas diluting the sulphur dioxide content of said stream of gas insufficiently to defeat said contact process.

10. The process which comprises diverting sulphur dioxide-containing gas from a stream flowing toward a contact mass in a sulphuric acid contact plant, subjecting said diverted gas to refrigeration and compression each to a degree at which the total power costs thereof are at a minimum per pound of liquid sulphur dioxide produced to liquefy some but not all of the sulphur dioxide therein, and combining the residual diverted gas with the undiverted portion of said stream, the relative amounts of said diverted portion, of said undiverted portion, and of the residual sulphur dioxide remaining in said diverted gas being so correlated as not to defeat the contact process.

11. The process which comprises diverting a portion of sulphur dioxide-containing gas from a stream flowing toward a contact mass in a sulphuric acid contact plant, enriching said diverted gas by oxidizing sulphur therein, subjecting said diverted and enriched gas to refrigeration and compression each to a degree at which the total power costs thereof per pound of liquid sulphur dioxide produced are at a minimum to liquefy some but not all of the sulphur dioxide therein, and combining the residual diverted gas with the undiverted portion of said stream, the relative amounts of said diverted portion, of said undiverted portion, and of the residual sulphur dioxide remaining in said diverted gas being so correlated as not to defeat the contact process.

HAROLD M. PITT, Jr.
ALFRED M. ESBERG.

CERTIFICATE OF CORRECTION.

Patent No. 2,162,637. June 13, 1939.

HAROLD M. PITT, JR., ET AL.

It is hereby certified that error appears in the printed specification of the above numbered patent requiring correction as follows: Page 1, first column, line 29, for the word "within" read wherein; page 5, second column, line 27, claim 6, for "separation" read separate; and that the said Letters Patent should be read with this correction therein that the same may conform to the record of the case in the Patent Office.

Signed and sealed this 8th day of August, A. D. 1939.

(Seal)

Leslie Frazer,
Acting Commissioner of Patents.